US008449851B2

(12) United States Patent
Naito

(10) Patent No.: US 8,449,851 B2
(45) Date of Patent: May 28, 2013

(54) MERCURY REMOVING SYSTEM AND MERCURY REMOVING METHOD

(75) Inventor: Toshiyuki Naito, Utsunomiya (JP)

(73) Assignee: IHI Corporation (JP)

( * ) Notice: Subject to any disclaimer, the term of this patent is extended or adjusted under 35 U.S.C. 154(b) by 0 days.

(21) Appl. No.: 13/509,683

(22) PCT Filed: Nov. 2, 2010

(86) PCT No.: PCT/JP2010/069475
§ 371 (c)(1),
(2), (4) Date: May 14, 2012

(87) PCT Pub. No.: WO2011/058906
PCT Pub. Date: May 19, 2011

(65) Prior Publication Data
US 2013/0034485 A1    Feb. 7, 2013

(30) Foreign Application Priority Data
Nov. 16, 2009    (JP) .................................. 2009-260996

(51) Int. Cl.
*B01D 53/50*    (2006.01)
*B01D 53/56*    (2006.01)
*B01D 53/64*    (2006.01)
*B01D 53/74*    (2006.01)
*B01D 53/76*    (2006.01)

(52) U.S. Cl.
USPC ... 423/210; 423/235; 423/239.1; 423/243.01; 423/DIG. 5; 422/105; 422/168; 422/169; 422/170; 422/171; 422/172

(58) Field of Classification Search
USPC ............ 423/210, 235, 239.1, 243.01, DIG. 5; 422/105, 168, 169, 170, 171, 172
See application file for complete search history.

(56) References Cited

U.S. PATENT DOCUMENTS

| 6,638,485 | B1 * | 10/2003 | Iida et al. ...................... 423/210 |
| 2012/0189521 | A1 * | 7/2012 | Shijo et al. ................. 423/239.1 |

FOREIGN PATENT DOCUMENTS

| JP | 2007-167743 | 7/2007 |
| JP | 2008-142602 | 6/2008 |
| JP | 2008-221087 | 9/2008 |
| JP | 2009-154067 | 7/2009 |
| JP | 2009-202107 | 9/2009 |
| JP | 2009-208078 | 9/2009 |
| JP | 2010-036157 | 2/2010 |

OTHER PUBLICATIONS

International Search Report and Written Opinion mailed Feb. 8, 2011 in corresponding PCT International Application No. PCT/JP2010/069475.

* cited by examiner

*Primary Examiner* — Timothy Vanoy
(74) *Attorney, Agent, or Firm* — Ostrolenk Faber LLP

(57) ABSTRACT

According to the present invention, a mercury removing system (A) includes a reaction gas supplier (20) that supplies reaction gas to treatment target gas; de-nitration equipment (2) that reduces nitrogen oxide in the treatment target gas to be removed and oxidizes low water-soluble mercury in the treatment target gas to obtain water-soluble mercury; and desulfurization equipment (7) that removes sulfur oxide and the low water-soluble mercury in the treatment target gas. The mercury removing system further includes an oxidation gas vaporizer (124) that heats an oxidation gas generating liquid to generate oxidation gas and a gas mixer (13) that mixes the oxidation gas with reducing gas to obtain the reaction gas, outside a flue and on the upstream side of the reaction gas supplier (20).

11 Claims, 4 Drawing Sheets

MERCURY REMOVING SYSTEM AND MERCURY REMOVING METHOD

CROSS-REFERENCE TO RELATED APPLICATIONS

The present application is a 35 U.S.C. §§371 national phase conversion of PCT/JP2010/069475, filed Nov. 2, 2010, which claims priority of Japanese Patent Application No. 2009-260996, filed Nov. 16, 2009, the contents of which are incorporated herein by reference. The PCT International Application was published in the Japanese language.

TECHNICAL FIELD

The present invention relates to a mercury removing system and a mercury removing method.

BACKGROUND ART

Coal combustion gas contains a small amount of mercury originating from coal. Mercury of this type may include low water-soluble metal mercury ($Hg^0$), water-soluble divalent mercury ($Hg^{2+}$($HgCl_2$)), and particulate mercury ($Hg^P$) attached to combustion ash. In an exhaust gas treatment system, most of the particulate mercury ($Hg^P$) can be removed by dust collecting equipment such as an electrostatic precipitator (EP) or a bag filter, and the water-soluble divalent mercury ($Hg^{2+}$) can be removed by wet flue-gas desulfurization (FGD) equipment with high efficiency. However, the low water-soluble metal mercury ($Hg^0$) is difficult to be removed with the EP and FGD equipment. Therefore, a method in which the metal mercury is changed to mercury chloride (that is, divalent mercury) in de-nitration equipment by adding hydrogen chloride to exhaust gas and then the mercury chloride is removed by absorption in the wet flue-gas desulfurization equipment is proposed.

For example, Patent Document 1 discloses a method in which a hydrogen chloride vaporizer directly heating an aqueous hydrogen chloride solution by hot air and generating hydrogen chloride is provided in an upstream side of denitrification equipment to supply the hydrogen chloride to exhaust gas in a flue, and metal mercury is changed to mercury chloride to be removed. In this technique, since the aqueous hydrogen chloride solution has a high oxidizing ability, the storage performance and the handleability are poor and thus there is a concern of corroding peripheral equipment. Accordingly, a technique of chlorinating the metal mercury by supplying ammonium chloride as a substitute thereof is proposed.

On the other hand, for example, Patent Document 2 discloses a method in which ammonium chloride powder is supplied to the bypass bypassing an economizer equipped with a boiler, and the ammonium chloride is sublimated by the heat of exhaust gas to obtain hydrogen chloride and ammonia, thereby supplying the hydrogen chloride to the exhaust gas.

However, in the method of directly supplying the ammonium chloride powder to the flue as in Patent Document 2, there is a problem that concentration of the hydrogen chloride in the exhaust gas deviates easily according to sublimation conditions of the ammonium chloride. Therefore, Patent Document 3 and Patent Document 4 disclose that liquid hydrogen chloride and ammonium are supplied to a flue through the supply ports. In addition, Patent Document 5 discloses that liquid ammonium chloride is supplied to a flue. The liquid hydrogen chloride, ammonia, and liquid ammonium chloride are evaporated by the heat of combustion gas to obtain hydrogen chloride gas and ammonia gas.

DOCUMENTS OF CONVENTIONAL ART

Patent Document

[Patent Document 1] Japanese Patent Application, First Publication No. 2008-142602

[Patent Document 2] Japanese Patent Application, First Publication No. 2008-221087

[Patent Document 3] Japanese Patent Application, First Publication No. 2010-36157

[Patent Document 4] Japanese Patent Application, First Publication No. 2008-142602

[Patent Document 5] Japanese Patent Application, First Publication No. 2009-154067

SUMMARY OF THE INVENTION

Problems to be Solved by the Invention

The concentration of hydrogen chloride in exhaust gas is controlled by adjusting a supply amount of ammonium chloride powder or liquid ammonium chloride before heating. Therefore, control delay and factors of instability occur due to feedback of detected concentration values and the process of supplying, heating, mixing and the like of the powder or liquid, resulting in a problem of rapid control being difficult.

In addition, a cross-sectional surface of a flue in a mercury removing system has a vertical length of about 10 m and a horizontal length of about 15 m in some cases. In a flue having such a wide cross-sectional area, it is difficult to eject a reaction liquid so as to make the concentration of the reaction liquid uniform.

Furthermore, in such a system, in order to reduce costs, the minimum size required for the design requirement, that is, reduction in the size of the system is required. Therefore, a length of a flue between a boiler and de-nitration equipment is limited. Accordingly, it is difficult to secure a space for newly providing a nozzle or the like which ejects a reaction liquid between the boiler and the de-nitration equipment previously provided.

In addition, in a case where a new member such as the nozzle which ejects a reaction liquid is provided in the flue, a pressure loss corresponding to several millimeter water columns is increased whenever one nozzle is added.

The present invention has been made in consideration of the above-described circumstances, and objects thereof are as follows.

(1) An oxidant which oxidizes metal mercury to water-soluble mercury is dispersed to a uniform concentration in gas containing the metal mercury.

(2) Concentration of the oxidant which is supplied to the gas containing the metal mercury is rapidly controlled.

(3) A nozzle which can disperse the oxidant to a substantially uniform concentration to eject it into the flue and can suppress pressure loss in the flue to the minimum is provided in a limited space.

Means for Solving the Problem

In order to achieve the above-described objects, the present invention employs the following means. That is, (1) According to the present invention, a mercury removing system includes: a reaction gas supplier that supplies reaction gas to treatment target gas containing metal mercury; de-nitration equipment that makes the treatment target gas and the reaction gas react with each other, reduces nitrogen oxide in the treatment target gas to be removed, and oxidizes the metal mercury in the treatment target gas to obtain water-soluble mercury; and desulfurization equipment that removes sulfur oxide and the water-soluble mercury in the treatment target gas. In addition, the mercury removing system further includes a gasifier that heats an oxidation gas generating liquid to generate oxidation gas which oxidizes the metal mercury and a gas mixer that mixes reducing gas which reduces the nitrogen oxide with the oxidation gas to obtain the reaction gas, outside a flue and on the upstream side of the reaction gas supplier.

(2) In the mercury removing system according to (1) described above, the reaction gas supplier may include a plurality of reaction gas supply nozzles provided in the flue, a valve for adjusting a flow rate of the reaction gas flowing from the gas mixer may be provided on a base end side of each of the plurality of reaction gas supply nozzles, a comb-like pipe line which is branched to a plurality of pipe lines may be provided on a tip end side of each of the plurality of reaction gas supply nozzles, and a plurality of ejection ports may be formed in the comb-like pipe lines extended in the vertical direction.

(3) The plurality of ejection ports which are provided in each of the plurality of reaction gas supply nozzles according to (2) described above may be formed across the entire cross-sectional surface in the flue.

(4) In each of the plurality, of reaction gas supply nozzles according to (3) described above, the opening and closing of the plurality of ejection ports may be partially adjusted by adjusting the opening and closing of the valve.

(5) The oxidation gas generating liquid which is used in the mercury removing system according to (1) described above may be an aqueous solution containing ammonium ions and halogen ions and an aqueous solution of at least one salt selected from the group consisting of ammonium chloride, ammonium bromide, and ammonium iodide.

(6) In the mercury removing system according to (1) described above, the treatment target gas which is a combustion gas is used as a heat source of the gasifier.

(7) In addition, according to the present invention, a mercury removing method includes: a reaction gas supply process of supplying reaction gas to treatment target gas containing metal mercury; a de-nitration process of making the treatment target gas and the reaction gas react with each other, reducing nitrogen oxide in the treatment target gas to be removed, and oxidizing the metal mercury in the treatment target gas to obtain water-soluble mercury; and a desulfurization process of removing sulfur oxide and the water-soluble mercury in the treatment target gas. In addition, the mercury removing method further includes a gasification process of heating an oxidation gas generating liquid to generate oxidation gas which oxidizes the metal mercury and a gas mixing process of mixing reducing gas which reduces the nitrogen oxide with the oxidation gas to obtain the reaction gas, as the preceding processes of the reaction gas supply process.

(8) In the mercury removing method according to (7) described above, the de-nitration process may further include a reaction gas concentration control process of measuring concentration of the nitrogen oxide on the downstream side of a de-nitration catalyst, determining that the reaction gas is insufficient in a position where the concentration of the nitrogen oxide is relatively high, opening a valve of a reaction gas supplier corresponding to an ejection port located in the position where the concentration of the nitrogen oxide is relatively high so as to increase an amount of the reaction gas in the position, and measuring again the concentration of the nitrogen oxide to adjust and set degrees of opening and closing of the valve according to the concentration of the nitrogen oxide.

(9) In the reaction gas concentration control process of the mercury removing method according to (8) described above, the opening and closing of the plurality of ejection ports may be partially adjusted by adjusting the opening and closing of the valve.

(10) The oxidation gas generating liquid which is used in the mercury removing method according to (7) described above may be an aqueous solution containing ammonium ions and halogen ions and an aqueous solution of at least one salt selected from the group consisting of ammonium chloride, ammonium bromide, and ammonium iodide.

(11) In the mercury removing method according to (7) described above, the treatment target gas which is a combustion gas may be used as a heat source in the gasification process.

Effects of the Invention

According to the present invention, the gas mixer mixing the oxidation gas and the reducing gas with each other is provided on the upstream of the reaction gas supplier and thus the oxidation gas can be supplied to treatment target gas in a state of being dispersed to a uniform concentration. In addition, by adjusting a supply amount of the oxidation gas generating liquid to the gasifier, the concentration of the oxidation gas in the treatment target gas can be rapidly controlled.

In addition, the reaction gas supply nozzle according to the present invention has a comb-like shape and thus can be disposed inside a flue with a limited (short) length, and can eject the reaction gas to be dispersed to a uniform concentration in a flue with a wide cross-sectional area while suppressing pressure loss to a minimum.

In addition, the gas mixer is provided outside the flue and the reaction gas supply nozzle can be attached inside the flue, thereby improving degrees of freedom in designing the system. Therefore, a main body of the system can be reduced in size and the gas mixer can be attached to the existing systems.

Therefore, according to the present invention, a mercury removing system with a high mercury removing capability which can efficiently change metal mercury in de-nitration equipment to water-soluble mercury dispersed to a uniform concentration and which can improve degrees of freedom in designing the system, and a method thereof can be provided.

EMBODIMENTS FOR IMPLEMENTING THE INVENTION

Hereinafter, an embodiment of the present invention will be described with reference to the drawings.

Figure 1:
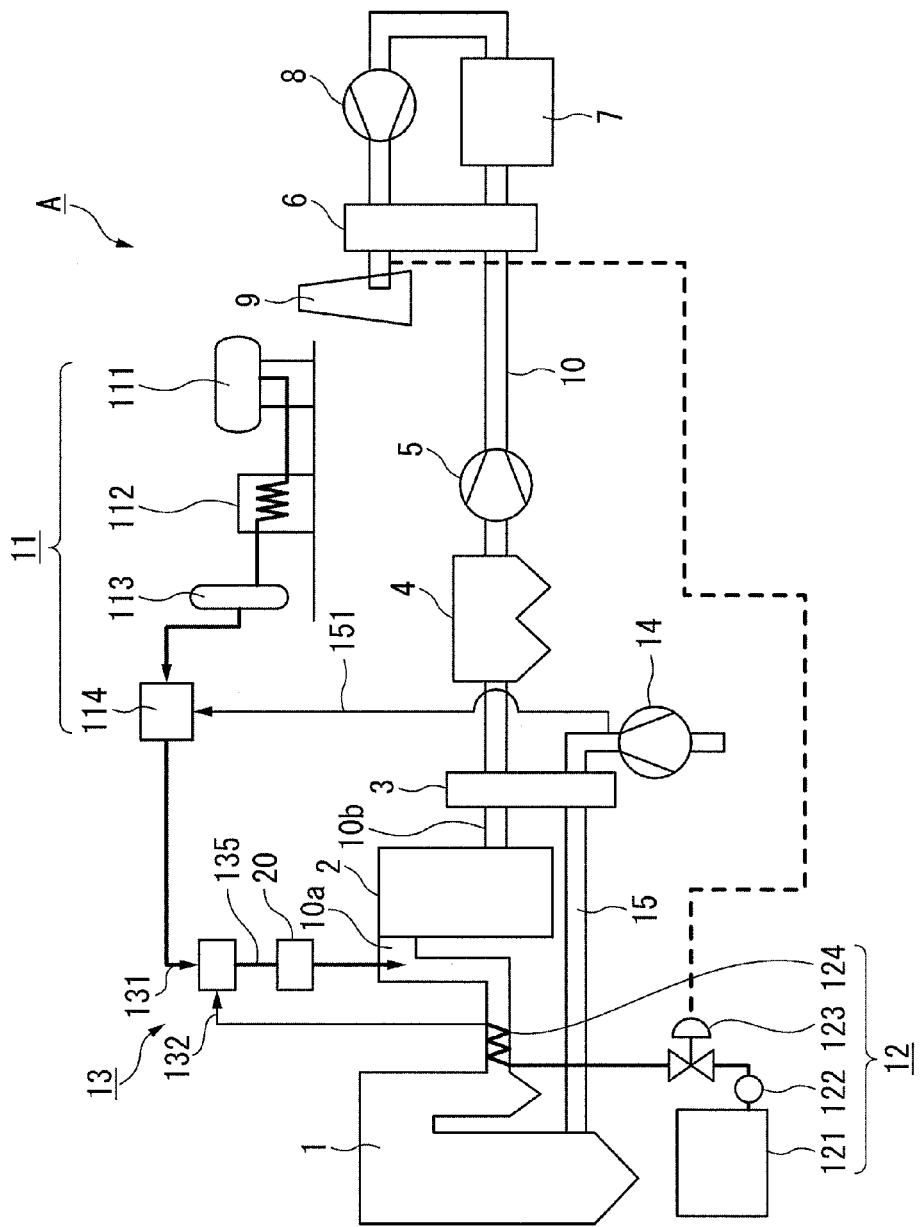
FIG. 1 is a diagram schematically illustrating a configuration of a mercury removing system according to an embodiment of the present invention.

As illustrated in FIG. 1, a mercury removing system A according to this embodiment sequentially includes, in a flue 10 from a boiler 1 to a chimney 9, de-nitration equipment 2, an air preheater 3, an electrostatic precipitator 4, an induced draft fan 5, a reheater 6, desulfurization equipment 7, and a boost-up fan 8. Furthermore, a reaction gas supplier 20 is provided on a flue 10a on the upstream side of the de-nitration equipment 2, and a gas mixer 13 supplies reaction gas to the reaction gas supplier 20. The gas mixer 13 is provided outside the flue 10, and an ammonia supplier 11 and an oxidation gas supplier 12 are connected to the gas mixer 13. In addition, the reaction gas supplier 20 includes a reaction gas supply nozzle 201 provided in the flue.

In the mercury removing system A, exhaust gas (treatment target gas) which is exhausted from the boiler 1 by combustion of coal and in which mercury is removed by sequentially passing through the equipment 2 to 8 provided between the boiler 1 and the chimney 9 through the flue 10, is discharged to the air through the chimney 9.

An air supply pipe 15 having a forced draft fan 14 is connected to the boiler 1, and the air preheated by the air preheater 3 is supplied from the air supply pipe 15 to combust coal, thereby generating the exhaust gas. The exhaust gas generated in the boiler 1 contains the mercury in addition to nitrogen oxide ($NO_X$), sulfur oxide ($SO_X$), and hydrogen halide. The mercury of this type may include low water-soluble metal mercury ($Hg^0$), particulate mercury ($Hg^P$), and water-soluble divalent mercury ($Hg^{2+}$($HgCl_2$)). The nitrogen oxide in the exhaust gas is removed by reduction in the de-nitration equipment 2. In addition, the sulfur oxide in the exhaust gas is removed by absorption in the desulfurization equipment 7.

The de-nitration equipment 2 removes the nitrogen oxide in the exhaust gas by reduction using reducing gas such as ammonia in the presence of a catalyst and oxidizes the metal mercury in the exhaust gas to the water-soluble mercury (divalent mercury) by using oxidation gas.

The reaction gas supplier 20 supplying the reaction gas to the exhaust gas is arranged in the flue 10a on the upstream side of the de-nitration equipment 2. A cross-sectional surface of the flue 10a has, for example, a vertical length of about 10 m and a horizontal length of about 15 m, and it is desirable to reduce these lengths for reduction in the size of the system. For example, in an example of the mercury removing system, the flue 10a is integrally formed with the boiler 1 in a lower section of the boiler 1. Accordingly, such a flue 10a has a length of, for example, 20 m to 30 m.

The exhaust gas to which the reaction gas is supplied is introduced into the de-nitration equipment 2. The reaction gas is formed of the oxidation gas and the reducing gas and diluted with the air to a predetermined concentration. The oxidation gas oxidizes the metal mercury in the exhaust gas to the water-soluble mercury, and is such as hydrogen halide or halogen gas.

Figure 2:
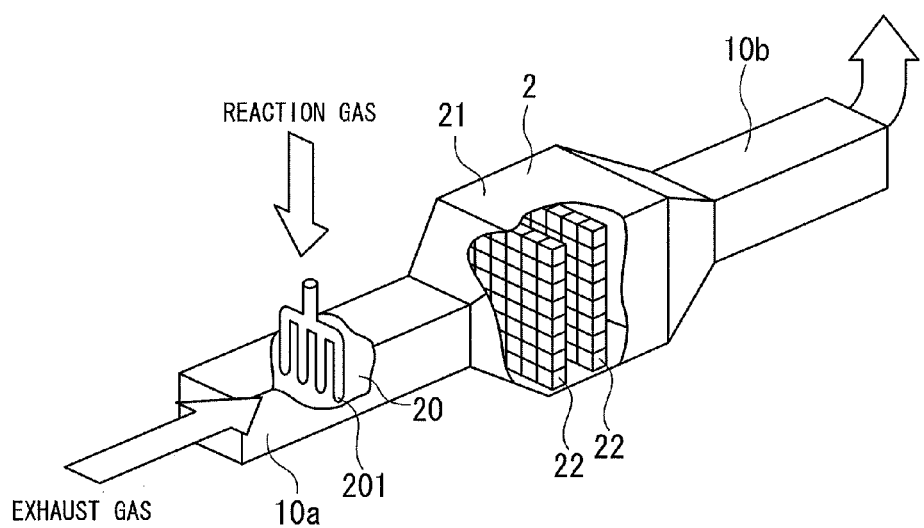
FIG. 2 is a perspective view schematically illustrating de-nitration equipment according to an embodiment of the present invention.

FIG. 2 is a perspective view schematically illustrating the de-nitration equipment 2 and the reaction gas supplier 20. The de-nitration equipment 2 includes a housing 21, and multiple catalytic layers 22 housed in the housing 21. The flue 10a on an inlet port side of the de-nitration equipment 2 is connected to the boiler 1, and a flue 10b on an outlet port side thereof is connected to the air preheater 3. The flue 10a on the inlet port side is connected to the reaction gas supplier 20 and the reaction gas is supplied to the de-nitration equipment 2 through the reaction gas supplier 20.

Figure 4:
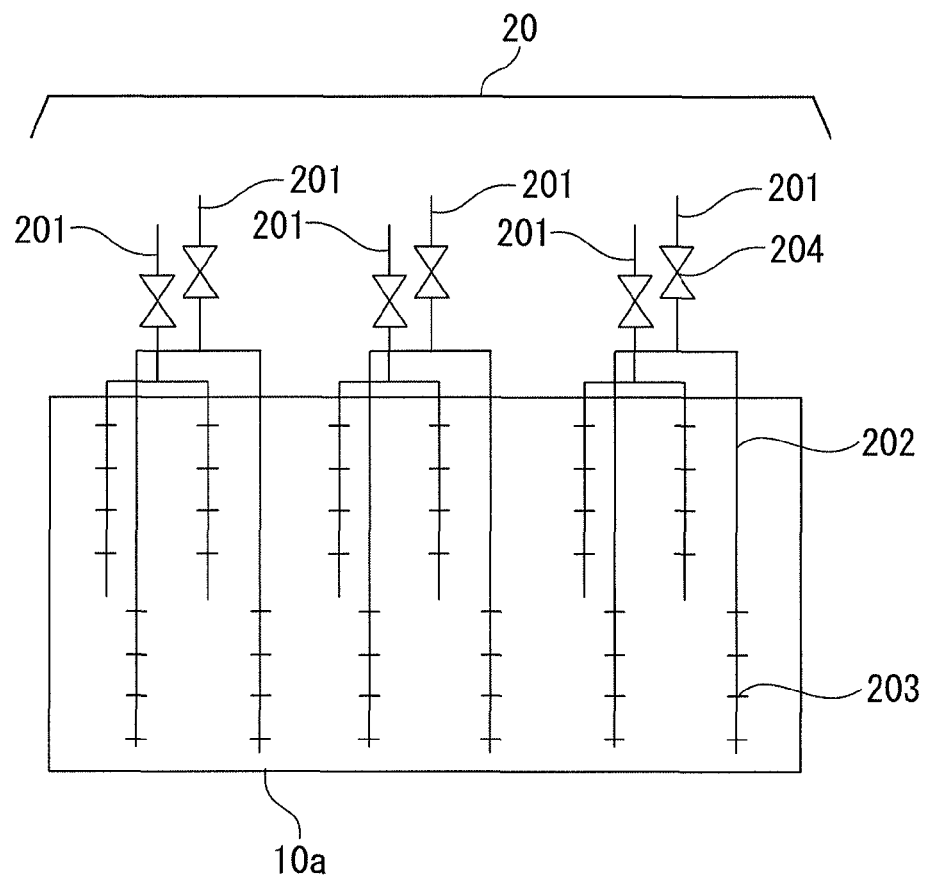
FIG. 4 is a diagram schematically illustrating a reaction gas supply nozzle provided in a flue according to an embodiment of the present invention.

As illustrated in FIG. 4, the reaction gas supplier 20 includes a comb-like reaction gas supply nozzle 201 with a tip end portion thereof branched to multiple pipe lines 202. The reaction gas is supplied to the entire area of the reaction gas supply nozzle 201 through a valve 204 provided in a base end portion of the reaction gas supply nozzle 201. By ejecting the reaction gas through multiple ejection ports 203 provided in the pipe lines 202 of the reaction gas supply nozzle 201, the reaction gas is uniformly dispersed and supplied to the exhaust gas in the flue 10a. A structure and a providing form of the reaction gas supplier 20 will be described below.

The catalytic layers 22 are housed in the housing 21 of the de-nitration equipment 2 and horizontal surfaces of the catalytic layers 22 are aligned in the vertical direction so as to face the flow of the exhaust gas. The catalytic layer 22 is obtained by forming catalysts into a honeycomb shape and burning the catalysts used in ammonia selective catalytic reduction (SCR) which selectively reduces the nitrogen oxide using ammonia to be decomposed to nitrogen and water. Since the horizontal surfaces of the catalytic layers 22 are aligned in the vertical direction so as to face the flow of the exhaust gas, the exhaust gas introduced into the de-nitration equipment 2 passes through the honeycomb-shaped catalytic surfaces.

Many sampling nozzles are provided in the de-nitration equipment 2. Furthermore, a $NO_X$ sensor (not illustrated) is provided for monitoring. During operation, by adjusting a valve (a specific structure thereof will be described below) provided in the reaction gas supply nozzle 201 so as to make concentration of ammonia gas uniform, concentration of ammonia, the reaction gas, and the like in the flue 10a having a wide cross-sectional area with a vertical length of about 10 m and a horizontal length of about 15 m are controlled to be uniform in the flue 10a all the time.

In order to maintain the concentration of the reaction gas uniform in this flue 10a having a wide cross-section area, the following control method, for example, will be performed on a regular basis.

1. Concentration of $NO_X$ on the downstream side of a de-nitration catalyst is measured.
2. In a position where the concentration of $NO_X$ is relatively high, it is determined that ammonia, that is, the reaction gas is insufficient.
3. In order to increase the amount of ammonia (amount of the reaction gas) in the position where the concentration of $NO_X$ is high, the valve 204 of the reaction gas supplier 20 corresponding to the ejection port 203 of the reaction gas supply nozzle 201 located in the position is opened.
4. The concentration of $NO_X$ is measured again to adjust and set degrees of opening and closing of the valve 204 according to the concentration of $NO_X$.

The degrees of opening and closing of the valve 204 which was set by performing the processes 1 to 4 above on a regular basis are manually adjusted. Therefore, it can be checked as needed whether or not an appropriate amount of the reaction gas is supplied for a flow rate of the exhaust gas or whether or not the reaction gas is ejected in the flue at a uniform concentration.

The methods of measuring the concentration of $NO_X$ in the process 1 above are not particularly limited. For example, in one of the catalytic layers 22, the concentration of $NO_X$ is measured at approximately 20 positions in different rows and columns having a honeycomb shape. In addition, the distribution of the concentration of $NO_X$ measured in these positions is considered, and the flow rate of the reaction gas is adjusted so as to correct errors thereof.

For example, errors are set within 30%. It is determined that a position where the concentration is more than 30% is not supplied with the reaction gas at a uniform concentration and the reaction gas is insufficient. Accordingly, the valve 204 of the reaction gas supplier 20 is opened. Since the concentration limit value of $NO_X$ in Japan is from 10 ppm to 40 ppm (in US, from 30 ppm to 40 ppm), it is necessary to make the reaction gas flow such that the concentration of $NO_X$ is within 30% of the range from 10 ppm to 40 ppm (that is, the upper limit of the concentration of $NO_X$ is 52 ppm).

Referring back to FIG. 1, the ammonia supplier 11 and the oxidation gas supplier 12 are connected to the reaction gas supplier 20 through the gas mixer 13.

Ammonia as the reducing gas is supplied from the ammonia supplier 11. The ammonia supplier 11 includes an ammonia storage tank 111, an ammonia vaporizer 112, an accumulator 113, and a dilution air mixer 114. The ammonia vaporizer 112 vaporizes liquid ammonia pressed and stored in the ammonia storage tank 111. The vaporized ammonia is temporarily retained in the accumulator 113 and supplied to the dilution air mixer 114 at a predetermined pressure. A pipe line 151 branched from the air supply pipe 15 of the boiler 1 is connected to the dilution air mixer 114 to dilute ammonia to a predetermined concentration with the air divided from the air for boiler combustion. The ammonia diluted with the air is introduced from an ammonia supply pipe 131 to the gas mixer 13.

The oxidation gas supplier 12 includes an oxidation gas generating liquid storage tank 121, a supply pump 122, a valve 123, and an oxidation gas vaporizer 124. The oxidation gas generating liquid storage tank 121 stores an oxidation gas generating liquid. As indicated by the broken line of FIG. 1, the supply pump 122 and the valve 123 are connected to a gas concentration detection system (not illustrated) provided on an inlet port side of the chimney 9, and supply a necessary amount of oxidation gas generating liquid to the oxidation gas vaporizer 124 according to control of the system. The oxidation gas generating liquid is heated by the oxidation gas vaporizer 124 to generate the oxidation gas. The oxidation gas is introduced into the gas mixer 13 through an oxidation gas supply pipe 132.

The oxidation gas vaporizer 124 includes a spiral vaporizing tube which is inserted into the flue 10 immediately below the boiler 1, and heats the oxidation gas generating liquid, which is introduced into the vaporizing tube, using the heat of the exhaust gas, thereby generating the oxidation gas. By using the exhaust gas as a heat source of the oxidation gas vaporizer 124, introduction of an external energy is not necessary and the oxidation gas can be economically generated. Normally, a temperature of the exhaust gas on an outlet port side of the boiler 1 is about 800° C. The temperature is dropped to about 400° C. by an economizer, but is sufficient for heating the oxidation gas vaporizer 124.

Figure 3:
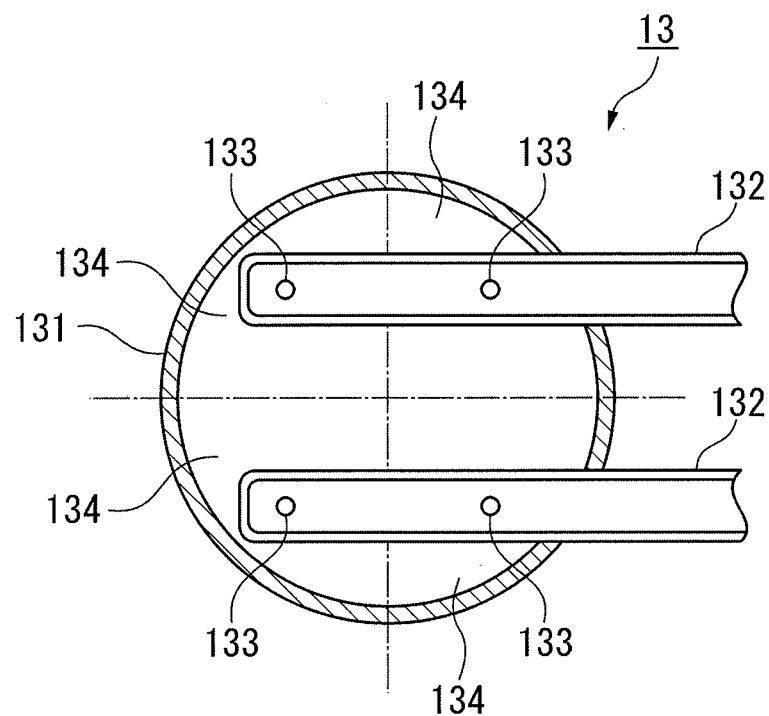
FIG. 3 is a cross-sectional view schematically illustrating a gas mixer according to an embodiment of the present invention.

FIG. 3 is a cross-sectional view schematically illustrating the gas mixer 13 provided outside the flue 10. As illustrated in FIG. 3, the gas mixer 13 includes the ammonia supply pipe 131, the two oxidation gas supply pipes 132 and 132, and a mixing tube portion (not illustrated), and mixes the gases with each other in the outside of the flue to be supplied to the flue. The tip end portions of the oxidation gas supply pipes 132 and 132 with a small diameter are inserted into the ammonia supply pipe 131 with a large diameter. The mixing tube portion is located inside the ammonia supply tube 131 on the downstream side from the insertion positions of the oxidation gas supply pipes 132 and 132.

The ammonia diluted with the air flows through the ammonia supply pipe 131, and the tip end portions of the oxidation gas supply pipes 132 and 132 are inserted in a direction perpendicular to the flowing direction above. In the tip end portions of the oxidation gas supply pipes 132 and 132, two oxidation gas ejection ports 133 are formed, that is, four of them in total are formed to eject the oxidation gas into the ammonia flow. These gases are uniformly mixed with each other while flowing through the mixing tube portion located on the downstream side from an ejection position, thereby obtaining the reaction gas. The reaction gas is introduced into the reaction gas supplier 20 through a pipe line 135.

The oxidation gas ejection ports 133 are located in the centers of balance of four fan-shaped cross-sectional surfaces 134 which are formed when a flow cross-sectional surface of the ammonia supply pipe 131 is divided into four areas. In such a design, the oxidation gas can be mixed at a uniform concentration into a large amount of ammonia flowing through the ammonia supply pipe 131 with a large diameter.

The number of the oxidation gas supply pipes 132 and the insertion intervals thereof; and the number of the oxidation gas ejection ports 133 formed and the formation positions thereof are not particularly limited. For example, when the number of the oxidation gas ejection ports 133 formed is n, the flow cross-sectional surface of the ammonia supply pipe 131 is divided into n areas to form n numbers of the fan-shaped cross-sectional surfaces 134. The number of the oxidation gas supply pipes 132 and the insertion intervals thereof; and the formation positions of the oxidation gas ejection ports 133 are designed such that the oxidation gas ejection ports 133 are located in the centers of balance of the fan-shaped cross-sectional surfaces 134. According to this design, the ammonia and the oxidation gas are uniformly mixed without providing other mixing means such as an agitation blade.

In addition, by providing the gas mixer 13 outside the flue 10a of the exhaust gas, the concentration of the ammonia and the oxidation gas in the reaction gas flowing in the flue can be easily adjusted before flowing as the reaction gas in the flue. Therefore, the concentration of the reaction gas can be appropriately changed according to the length, cross-sectional area, and exhaust gas amount of the flue, and the reaction gas in which the ammonia and the oxidation gas are uniformly mixed can be made to flow in the flue.

Furthermore, by providing the gas mixer 13 outside the flue, the gas mixer 13 may not be integrally provided with a main body of the system. Therefore, the main body of the system can be reduced in size and the gas mixer can be attached to the existing systems.

The reaction gas mixed by the gas mixer 13 is supplied to the reaction gas supply nozzle 201 through the reaction gas supplier 20.

FIG. 4 is an example of a shape and a providing form of the reaction gas supplier 20 provided in the flue 10a. In the example illustrated in FIG. 4, six supply nozzles 201 in total are provided in which two of the nozzles form one set and three sets are arranged in parallel in the horizontal direction (direction crossing the flue 10a). In FIG. 4, each of the reaction gas supply nozzles 201 has the pipe line 202 extending in the vertical direction. A base end (upper end) of the pipe line 202 is connected to the above-described pipe line 135. In addition, the valve 204 for adjusting a flow rate of the reaction gas in the flue 202 is provided on the base end side of the flue 202.

A tip end (lower end) of the pipe line 202 is branched to two pipe lines in the above-described horizontal direction and extends again in the vertical direction. As a result, the reaction gas supply nozzle 201 is provided with the valve 204 on the base end side and the tip end is branched to the pipe lines 202 to form a comb-like shape.

The ejection ports 203 are provided in the branched pipe lines 202 along the extending direction of the pipe lines 202 at predetermined intervals. In particular, in one of the two reaction gas supply nozzles 201 forming a single set, the tip ends of the branched pipe lines 202 reach center portions of the flue 10a in the vertical direction and the above-described ejection ports 203 are formed in the range between the tip ends of the branched pipe lines 202 and the upper end of the flue 10a. In addition, in the other one of the two reaction gas supply nozzles 201 forming a single set, the tip ends of the branched pipe lines 202 reach lower end portions of the flue 10a and the above-described ejection ports 203 are formed in the range between the tip ends of the branched pipe lines 202 and the center portions of the flue 10a in the vertical direction.

Then, by arranging the pipe lines 202 in this way, the ejection ports 203 can be formed across almost the entire area of the cross-sectional surface of the flue 10a. In addition, by adjusting the opening and closing of each of the valves 204 provided in the six nozzles 201 in total, the opening and closing of the ejection ports 203 formed across almost the entire area of the cross-sectional surface of the flue 10a can be partially adjusted.

In addition, specific shapes of the reaction gas supplier 20, that is, the number of the ejection ports 203 in the reaction gas supply nozzle 201, the formation positions of the ejection ports 203 in the pipe line, the number of the branched pipe lines 202, and the lengths of the pipe lines 202 vary depending on the length and cross-sectional surface, and the like of the flue 10a, and thus are not particularly limited. In order for the reaction gas to be dispersed to a uniform concentration in the exhaust gas flowing through the flue 10a, it is preferable that the shape and providing position of the reaction gas supply nozzle 201 are adjusted while the dispersion of the reaction gas is adjusted.

Since the reaction gas supply nozzle 201 has the pipe lines to form a comb-like shape, the exhaust gas flows between the pipe lines. While the exhaust gas flows between the pipe lines, the reaction gas is ejected through the ejection ports provided in the pipe lines. Accordingly, the exhaust gas flows in the de-nitration equipment 2 while reacting with the reaction gas.

In order for the exhaust gas to flow from the boiler 1 up to the chimney 9, pressure loss in the flue 10 is desirably suppressed as low as possible. However, by inserting a member into the flue 10, an increase in pressure loss occurs. Therefore, the reaction gas supply nozzle 201 according to the present invention has a comb-like shape. As a result, the pressure loss of the exhaust gas flowing between the nozzles can be suppressed to several millimeter water columns for each of the reaction gas supply nozzles 201. However, when considering the suppression of the pressure loss, it should be noted that a pressure loss corresponding to several millimeter water columns is increased whenever one of the reaction gas supply nozzles 201 is added in the flue. Accordingly, in order for the number of the reaction gas supply nozzles 201 inserted into the flue 10 to be suppressed to a minimum, it is preferable to adjust the positions and the number of the ejection ports.

The reaction gas supply nozzles 201 according to the present invention can be inserted into a limited space while the pressure loss is suppressed. Therefore, an additional nozzle can be provided in the existing flue without extending the flue.

Referring back to FIG. 1, the air preheater 3 is connected to the flue 10b on the downstream side of the de-nitration equipment 2. The air preheater 3 preheats the air for boiler combustion while cooling the exhaust gas exhausted from the de-nitration equipment 2. A temperature of the de-nitration equipment 2 is normally from 350° C. to 400° C., which is sufficient for heating the combustion air.

The electrostatic precipitator 4 is arranged on the downstream side of the air preheater 3 through the flue 10. The electrostatic precipitator 4 introduces the exhaust gas into an electrical field formed between a discharge electrode and a collecting electrode and attaches solid particles in the exhaust gas to the collecting electrode to be removed. The particulate mercury ($Hg^P$) among the types of low water-soluble mercury is removed in addition to the solid particles such as soot and dust in the exhaust gas. The induced draft fan 5 is arranged on the downstream of the electrostatic precipitator 4 through the flue 10. The induced draft fan 5 introduces the exhaust gas into the desulfurization equipment 7 through the reheater 6.

The reheater 6 includes a heat exchanger (not illustrated) provided in the upstream side of the desulfurization equipment 7. Using heat energy collected by this heat exchanger, heat energy is collected from the exhaust gas to be introduced into the desulfurization equipment 7 and the exhaust gas with a lower temperature which is purified by the desulfurization equipment 7 is heated. As a result, when the purified exhaust gas is discharged from the chimney 9 to the air, the diffusibility is improved and white smoke caused by water vapor can be prevented.

The desulfurization equipment 7 removes the water-soluble mercury in addition to water-soluble substances such as nitrogen oxide or hydrogen chloride in the exhaust gas and fine particles which cannot be completely collected by the electrostatic precipitator 4. As the removing method, a removing method in which an absorbing liquid absorbs these predetermined water-soluble substances is employed. The desulfurization equipment 7 is not particularly limited, and examples thereof include wet flue-gas desulfurization equipment and an absorption tower which are generally used in the flue gas treatment. As the absorbing liquid, an alkali absorbing liquid is preferable, for example, an aqueous solution containing an absorbent such as calcium carbonate, calcium oxide, calcium hydroxide, magnesium hydroxide, sodium carbonate, sodium hydroxide, or ammonia.

The boost-up fan 8 is arranged on the downstream side of the desulfurization equipment 7 through the flue 10, and the exhaust gas purified by the desulfurization equipment 7 is transported to the reheater 6 and the chimney 9 by the boost-up fan 8. The purified exhaust gas is discharged to the air through the chimney 9. A sensor for measuring the concentration of $NO_X$ is arranged on the most downstream of the flue 10, and a supply amount of the reaction gas by the reaction gas supplier 20 is adjusted according to detected values of the concentration of $NO_X$ of the sensor.

Next, a mercury removing method using the mercury removing system A having such a configuration will be described.

The exhaust gas generated in the boiler 1 is first introduced into the flue 10a. A heat generated along with the exhaust gas is collected by the oxidation gas vaporizer 124 and used as a heat for generating the oxidation gas. When the exhaust gas flows through the flue 10a, the reaction gas is supplied to the flue 10a by the reaction gas supplier 20. Then, the exhaust gas and the reaction gas are introduced into the de-nitration equipment 2 while reacting with each other.

The ammonia supplier 11 vaporizes ammonia. The oxidation gas vaporizer 124 vaporizes the oxidation gas generating liquid to the oxidation gas. The oxidation gas generating liquid is not particularly limited as long as it is a liquid as a source of generating the oxidation gas and a liquid which generates the oxidation gas by heating. For example, the oxidation gas generating liquid is an aqueous solution containing ammonium ions and halogen ions, preferable examples thereof include an aqueous ammonium chloride solution, an aqueous ammonium bromide solution, and an aqueous ammonium iodide solution which produce ammonia as a by-product, and a mixed solution of the above solutions may be also used.

When the oxidation gas generating liquid is the aqueous ammonium chloride solution, hydrogen chloride and chlorine gas are obtained as the oxidation gas. When the oxidation gas generating liquid is the aqueous ammonium bromide solution, hydrogen bromide and bromine gas are obtained as the oxidation gas. When the oxidation gas generating liquid is the aqueous ammonium iodide solution, hydrogen iodide and iodine gas are obtained as the oxidation gas. In addition, iodine is solid at normal temperature under normal pressure, but is obtained as a gas (oxidation gas) at a heating temperature (from 350° C. to 400° C.) of the oxidation gas vaporizer 124 because the boiling point thereof is 114° C. In either case, ammonia is generated as a by-product gas in addition to hydrogen halide and halogen gas. This ammonia can be used as the reducing gas which reduces the nitrogen oxide in the exhaust gas.

Since the molecular weight of halogen is larger, the reactive property thereof is lower. Therefore, halogen is preferable for the aqueous ammonium chloride solution generating hydrogen chloride and chlorine gas. However, a high oxidation property of the aqueous ammonium chloride solution causes a side reaction that sulfur dioxide ($SO_2$) in the exhaust gas is changed to sulfur trioxide ($SO_3$). Therefore, the side reaction consumes hydrogen chloride, and there is a possibility that mercury removal efficiency may be deteriorated. Accordingly, when the aqueous ammonium bromide solution generating hydrogen bromide and bromine, which are less reactive, is used, the oxidation gas is made to engage with only the oxidation reaction of the metal mercury.

In order to prevent ammonium halide in the oxidation gas generating liquid from being precipitated as a solid, a heating temperature of the gas vaporizer 124 is preferably greater than or equal to a sublimation temperature of the ammonium halide. At normal temperature under normal pressure, a sublimation temperature of the ammonium chloride is 338° C., a sublimation temperature of the ammonium bromide is 452° C., and a sublimation temperature of the ammonium iodide is 551° C. Therefore, it is preferable to perform heating at a temperature higher than these temperatures.

A supply amount of the oxidation gas generating liquid to the oxidation gas vaporizer 124 is adjusted by the supply pump 122 and the valve 123. As a result, an amount of the vaporized oxidation gas and a supply amount of the oxidation gas to the gas mixer 13 are adjusted. The supply pump 122 and the valve 123 are connected to multiple gas concentration sensors provided in the respective elements of the mercury removing system A, and the adjustment is performed according to detected values of the sensors.

The ammonia and the oxidation gas are uniformly mixed by the gas mixer 13 to obtain the reaction gas and supplied to the reaction gas supply nozzle 201 through the reaction gas supplier 20. Then, the exhaust gas flowing between the pipe lines of the reaction gas supply nozzle 201 flows in the de-nitration equipment 2 while reacting with the reaction gas ejected from the pipe line. A mixing ratio of the ammonia and the oxidation gas in the gas mixer 13 is appropriately selected according to the type of coal combusted in the boiler 1 and concentration of the mercury in the exhaust gas, for example, by volume ratio, diluted air:ammonia:oxidation gas=93:5:2.

In the de-nitration equipment 2, the nitrogen oxide in the exhaust gas is reduced in the de-nitration process to be removed and the metal mercury is oxidized to the water-soluble mercury. The exhaust gas subjected to the de-nitration process is introduced into the de-nitration equipment 2, the air preheater 3, and the electrostatic precipitator 4 in sequence. The air preheater 3 collects the heat of the exhaust gas to heat the combustion air of the boiler 1. The electrostatic precipitator 4 removes the low water-soluble particulate mercury and the soot and dust in the exhaust gas. The exhaust gas treated by the electrostatic precipitator 4 is transported toward the chimney 9 through the flue 10 by the induced draft fan 5.

Next, the exhaust gas is introduced into the reheater 6 so as to collect the heat for heating the purified exhaust gas. Then, the exhaust gas is introduced into the desulfurization equipment 7.

The desulfurization equipment 7 removes a residue of the particulate mercury and the soot and dust which is not completely removed by the electrostatic precipitator 4, in addition to the sulfur oxide and the water-soluble mercury in the exhaust gas, by absorption using the absorbing liquid. In this way, the exhaust gas purified by removing the nitrogen oxide, the sulfur oxide, the low water-soluble mercury, the water-soluble mercury, and the soot and dust is transported by the boost-up fan 8, heated by the reheater 6, and discharged to the air through the chimney 9.

As described above, in this embodiment, the aqueous ammonium halide solution, that is, the oxidation gas generating liquid is employed as the source of generating the oxidation gas, and the oxidation gas generating liquid is gasified by the oxidation gas vaporizer 124. Accordingly, the oxidation gas can be generated at a uniform concentration. In addition, the oxidation gas and the ammonia are mixed by the gas mixer 13, and thus the reaction gas in which the oxidation gas is dispersed to a uniform concentration is obtained. Furthermore, the reaction gas is supplied to the exhaust gas from the reaction gas supply nozzle 201 arranged in the flue 10a on the inlet port side of the de-nitration equipment 2, and thus the oxidation gas can be dispersed to a uniform concentration in the de-nitration equipment 2 to react with the exhaust gas efficiently.

In addition, in the present invention, the aqueous ammonium halide solution, that is, the oxidation gas generating liquid is employed as the source of generating the oxidation gas. Therefore, simply by adjusting the supply amount of the oxidation gas generating liquid, the supply amount of the reaction gas can be easily adjusted and the reaction gas can be stably supplied, as compared to a case where the ammonium chloride as a solid is directly supplied to the flue 10 to generate hydrogen chloride. Accordingly, a rapid response can be made according to detected values measured by the gas concentration detection system, and thus control delay does not occur.

In addition, by providing the gas mixer 13 outside the flue 10a of the exhaust gas, the ammonia and the oxidation gas of the reaction gas flowing in the flue can be introduced into the flue in a state of being mixed at a more uniform concentration.

Furthermore, by providing the gas mixer 13 outside the flue, the gas mixer 13 may not be integrally provided with the main body of the system in designing the system. Therefore, the main body of the system can be reduced in size and the gas mixer 13 can be attached to the existing systems.

In addition, in the present invention, by providing the comb-like reaction gas supply nozzle 201 in the flue, the reaction gas supply nozzle 201 can be provided in the flue with a limited length. In addition, the ejection ports 203 of the reaction gas supply nozzle 201 are provided across almost the entire area of the cross-sectional surface of the flue 10a and the reaction gas supply nozzle 201 has a comb-like shape. Therefore, the reaction gas can be ejected at a uniform concentration in the wide flue and the pressure loss can be suppressed. Furthermore, by measuring the concentration of $NO_X$ in the de-nitration equipment 2 during operation, an amount of the reaction gas ejected from the ejection port 203 of the reaction gas supply nozzle 201 can be adjusted so as to be ejected at a more uniform concentration.

In addition, in the present invention, the aqueous ammonium halide solution is used. The aqueous ammonium halide solution generates the by-product ammonia as well as the oxidation gas by heating. The ammonia is used in the de-nitration reaction, and thus hardly affects a reaction system for removing the mercury. In addition the by-product ammonia can be used in the de-nitration equipment. Accordingly, the system capable of efficiently and economically removing the mercury can be provided.

In addition, in the present invention, the treatment target gas which is a combustion exhaust gas is used as the heat source of the gasifier. The heat of the treatment target gas is collected to heat the oxidation gas generating liquid, and thus an energy supply for purposes other than that of generating the oxidation gas is unnecessary. In addition, the heat of the treatment target gas can be efficiently used and thus the mercury treatment system with a high energy usage efficiency can be obtained.

Here, the present invention is not limited to the above-described embodiment, and the following modification can be considered, for example.

(1) A filter dust collector such a bag filter may be used instead of the electrostatic precipitator 4.

(2) The dilution air mixer 114 may be used as the gas mixer 13 by connecting the oxidation gas supply pipe 132 to the upstream side of the dilution air mixer 114 of the ammonia supplier 11.

Industrial Applicability

According to the present invention, the metal mercury in the de-nitration equipment can be efficiently changed to the water-soluble mercury dispersed to a uniform concentration and the mercury removing system with a high mercury removing capability in which the degrees of freedom in designing the system is improved and the method thereof can be provided.

DESCRIPTION OF REFERENCE SIGNS

A mercury removing system
1 boiler
2 de-nitration equipment
3 air preheater
4 electrostatic precipitator
5 induced draft fan
6 reheater
7 desulfurization equipment
8 boost-up fan
9 chimney
10 flue
11 ammonia supplier
111 ammonia storage tank
112 ammonia vaporizer
113 accumulator
114 dilution air mixer
12 oxidation gas supplier
121 oxidation gas generating liquid storage tank
122 supply pump
123 valve
124 oxidation gas vaporizer
13 gas mixer
131 ammonia supply pipe
132, 132 oxidation gas supply pipe
14 forced draft fan
15 air supply pipe
20 reaction gas supplier
21 housing
22 catalytic layer
201 reaction gas supply nozzle
202 pipe line
203 ejection port
204 valve

The invention claimed is:

1. A mercury removing system comprising:
a reaction gas supplier that supplies reaction gas to treatment target gas containing metal mercury;
de-nitration equipment that makes the treatment target gas and the reaction gas react with each other, reduces nitrogen oxide in the treatment target gas to be removed, and oxidizes the metal mercury in the treatment target gas to obtain water-soluble mercury; and
desulfurization equipment that removes sulfur oxide and the water-soluble mercury in the treatment target gas, wherein
the mercury removing system further comprises a gasifier that heats an oxidation gas generating liquid to generate oxidation gas which oxidizes the metal mercury and a gas mixer that mixes reducing gas which reduces the nitrogen oxide with the oxidation gas to obtain the reaction gas, outside a flue and on the upstream side of the reaction gas supplier.

2. The mercury removing system according to claim 1, wherein
the reaction gas supplier includes a plurality of reaction gas supply nozzles provided in the flue,
a valve for adjusting a flow rate of the reaction gas flowing from the gas mixer is provided on a base end side of each of the plurality of reaction gas supply nozzles,
a comb-like pipe line which is branched to a plurality of pipe lines is provided on a tip end side of each of the plurality of reaction gas supply nozzles, and
a plurality of ejection ports are formed in the comb-like pipe line branched to the plurality of pipe lines.

3. The mercury removing system according to claim 2, wherein
the plurality of ejection ports are formed across the entire cross-sectional surface in the flue.

4. The mercury removing system according to claim 3, wherein
the opening and closing of the plurality of ejection ports can be partially adjusted by adjusting the opening and closing of the valve.

5. The mercury removing system according to claim 1, wherein
the oxidation gas generating liquid is an aqueous solution containing ammonium ions and halogen ions and an aqueous solution of at least one salt selected from the group consisting of ammonium chloride, ammonium bromide, and ammonium iodide.

6. The mercury removing system according to claim 1, wherein
the treatment target gas which is combustion exhaust gas is used as a heat source of the gasifier.

7. A mercury removing method comprising:
a reaction gas supply process of supplying reaction gas to treatment target gas containing metal mercury;
a de-nitration process of making the treatment target gas and the reaction gas react with each other, reducing nitrogen oxide in the treatment target gas to be removed, and oxidizing the metal mercury in the treatment target gas to obtain water-soluble mercury; and
a desulfurization process of removing sulfur oxide and the water-soluble mercury in the treatment target gas, wherein
the mercury removing method further comprises a gasification process of heating an oxidation gas generating liquid to generate oxidation gas which oxidizes the metal mercury and a gas mixing process of mixing reducing gas which reduces the nitrogen oxide with the oxidation gas to obtain the reaction gas, as the preceding processes of the reaction gas supply process.

8. The mercury removing method according to claim 7, wherein the de-nitration process further includes a reaction gas concentration control process of measuring concentration of the nitrogen oxide on the downstream side of a de-nitration catalyst, determining that the reaction gas is insufficient in a position where the concentration of the nitrogen oxide is relatively high, opening a valve of a reaction gas supplier corresponding to an ejection port located in the position where the concentration of the nitrogen oxide is relatively high so as to increase an amount of the reaction gas in the position, and measuring again the concentration of the nitrogen oxide to adjust and set degrees of opening and closing of the valve according to the concentration of the nitrogen oxide.

9. The mercury removing method according to claim 8, wherein the opening and closing of the plurality of ejection ports can be partially adjusted by adjusting the opening and closing of the valve.

10. The mercury removing method according to claim 7, wherein the oxidation gas generating liquid is an aqueous solution containing ammonium ions and halogen ions and an aqueous solution of at least one salt selected from the group consisting of ammonium chloride, ammonium bromide, and ammonium iodide.

11. The mercury removing method according to claim 7, wherein the treatment target gas which is combustion exhaust gas is used as a heat source in the gasification process.

* * * * *